United States Patent Office 2,815,677
Patented Dec. 10, 1957

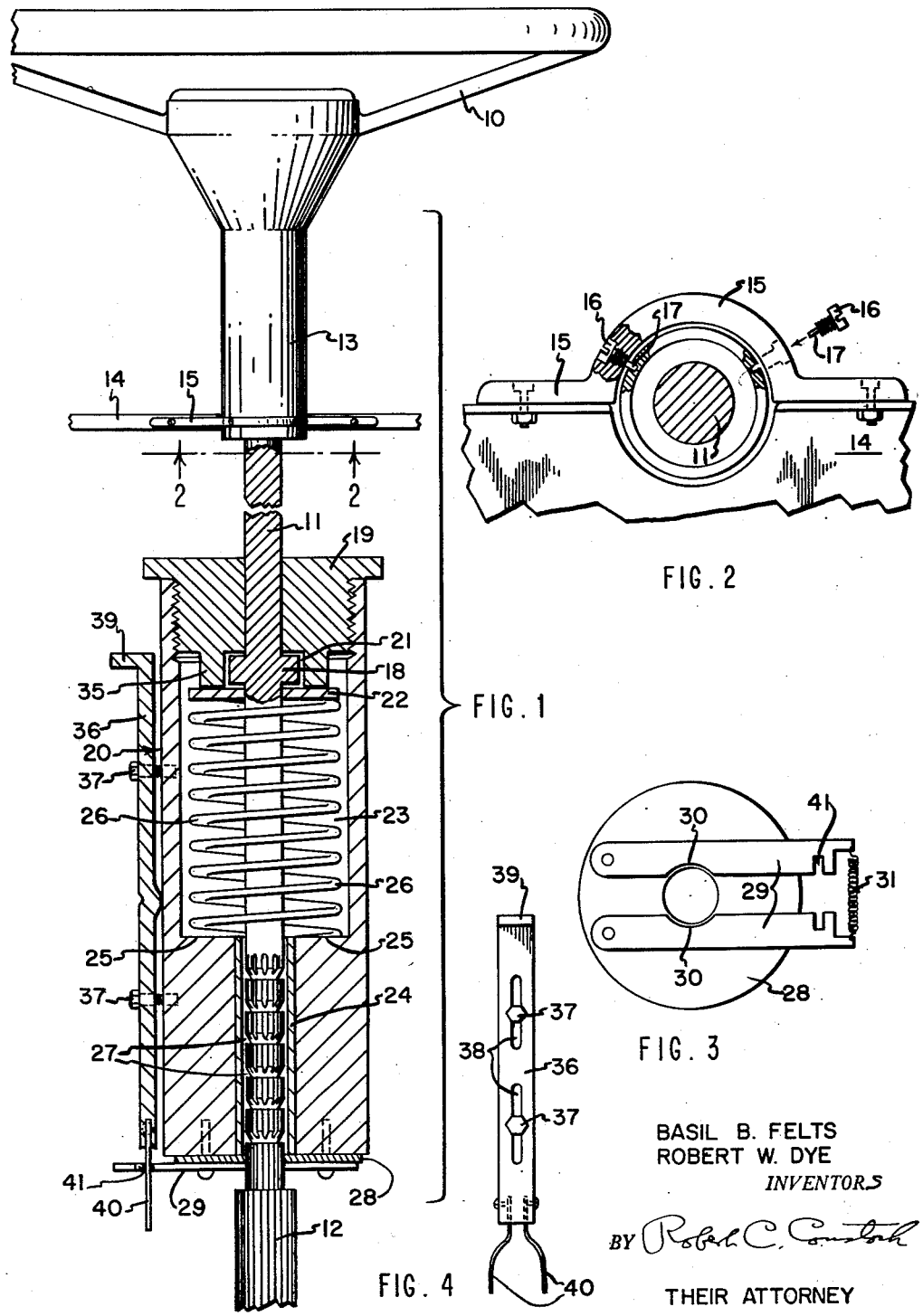

2,815,677

DEPRESSIBLE STEERING CONSTRUCTION FOR AUTOMOTIVE VEHICLES

Basil B. Felts and Robert W. Dye, Banning, Calif.

Application February 13, 1956, Serial No. 565,189

9 Claims. (Cl. 74—493)

This invention relates to a depressible steering construction for automotive vehicles. This application is a continuation in part and improvement upon our application Serial No. 550,362, filed December 1, 1955.

It is a well-known fact that large numbers of persons are killed or seriously injured due to impact with the steering wheel and steering assembly of an automotive vehicle upon the occurrence of a collision. It is an object of our invention to provide a depressible steering construction for automotive vehicles which is adapted to automatically yield beneath the impact of the driver's body in the event of a collision. It is particularly an object of our invention to provide such a structure in which its yieldability does not interfere in any way with the operation and driving control of the steering assembly.

It is another object of our invention to provide a device of the type described which is simple in construction and design, requiring only a limited number of easily manufactured and assembled parts, so that it is capable of widespread use by manufacturers and the general public. It is a related object of our invention to provide such a structure which may be installed as original equipment at the time an automotive vehicle is manufactured or which may be easily, quickly and economically installed on any new automotive vehicle.

It is a further object of our invention to provide such a device in which the steering column passes through the longitudinal axis of a coil spring. The column thus prevents dislocation or binding of the spring and assures its proper operation and orientation at all times. Our construction is further so designed that the steering wheel and column are completely free from any pressure or binding from the spring.

The depressible steering construction of our invention contemplates a housing having an integral shoulder for receiving the lower end of a coil spring. The steering column extends longitudinally through the axis of the coil spring and housing. The top of the housing, through which the steering column enters, is provided with an adjustable bushing. The bushing engages and surrounds a flange on the steering column. The upper end of the coil spring bears against a ring which fits against the lower end of the bushing, leaving the steering column free from pressure from the coil spring. The lower part of the steering column is notched to receive a pair of spring biased dogs to hold the steering wheel in depressed but operable position in the event of collision. The notched portion of the steering column is splined for connection to the receiver. Provision is made for the electrical wires to pass from the steering wheel to the battery and other parts of the vehicle without entanglement at any time.

In addition, the steering column housing may be held in position by one or more screws having tips of reduced diameter which extend into the housing and which are adapted to be sheared off upon downward impact upon the steering wheel.

It is accordingly an object of our invention to provide a device having all of the features and advantages of the construction set forth.

Our invention also comprises such other objects, advantages and capabilities as will later more fully appear and which are inherently possessed by our invention.

While we have shown in the accompanying drawings a preferred embodiment of our invention, it should be understood that the same is susceptible of modification and change without departing from the spirit of our invention.

Referring to the drawings,

Fig. 1 is an elevational view of my depressible steering construction, with the portion beneath the dashboard shown mostly in section;

Fig. 2 is a sectional view taken on line 2—2 of Fig. 1;

Fig. 3 is a top plan view of the dogs at the bottom of the housing;

Fig. 4 is a front elevational view of the manual release member.

A preferred embodiment which has been selected to illustrate our invention comprises a steering wheel 10, which is preferably formed of conventional substantially rigid materials. Collapsibility of the steering wheel per se is believed to be undesirable, since it necessarily interferes with the function and steering control of the wheel, whereas our device remains completely operable at all times.

A steering column 11 is attached at its upper end to the steering wheel 10 and at its lower end to a receiver 12 by splines, the receiver in turn being connected to the gear box.

Surrounding the upper part of the steering column 11 is a steering column housing 13, which extends through the dashboard 14 of the vehicle. The steering column housing 13 does not turn with the steering wheel 10. The lower end of the steering column housing 13 is disposed beneath the dashboard 14.

The steering column housing 13 may, if desired, be attached to the dashboard by a mounting member 15, which has two flat ends, which are attached to the dashboard 14 by suitable fastening means, and a semi-circular center portion which surrounds the steering column housing 13. A pair of screws 16 are screw threadedly mounted in the semi-circular portion of mounting member 15. The ends 17 of screws 16 are of reduced diameter and extend into complementary openings in the steering column housing 13. The screws 16 thus hold the steering column housing 13 normally in fixed longitudinal relationship to the dashboard 14. Upon impact against the steering wheel 10, however, the ends 17 of the screws 16 will be sheared off, permitting downward movement of the steering column housing 13.

A transmission shifting lever may be provided adjacent the steering wheel 10 or elsewhere, as desired. A turn signal indicator may also be mounted on the steering column housing 13. The electric wires from the horn and turn signal indicator pass downwardly through the steering column housing 13.

The steering column 11 is provided with an outwardly directed substantially circular flange 18 adjacent the midportion thereof. The portion of the steering column 11 directly above the flange 18 extends through an adjustable bushing 19 into an elongated cylindrical housing 20. The bushing 19 has exterior screw threading which fits into a screw threaded opening in the top of the housing 20.

The lower end of the bushing 19 is provided with a downwardly directed collar 35, the outer diameter of which is smaller than that of the remainder of the bushing 19. The collar 35 is provided with a central recess 21, the inner diameter of which is slightly larger than that of the flange 18 and the depth of which slightly exceeds the thickness of the flange 18. A circular washer 22 fits against the lower end of the collar 35.

Referring to Fig. 1 of the drawings, the clearances between the parts have been somewhat exaggerated in this figure in order to show that the flange 18 of the steering column 11 fits within the recess 21 and is surrounded by the bushing 19 and its collar 35.

The housing 20 is preferably formed from a solid metal cylinder which is drilled to provide a hollow portion 23 in the upper part thereof and has an elongated bearing 24 in the lower part thereof, in which the lower end of the steering column 11 is journaled. The housing 20 is provided with an inwardly directed shoulder 25. A coil spring 26 is mounted within the hollow portion 23 of housing 20, surrounding the steering column 11, with its lower end bearing against the top of the shoulder 25 and its upper end bearing against the washer 22.

The bushing 19 is preferably provided with a Zerk fitting or other means through which lubrication can pass.

The portion of the steering column 11 which is directly above the bottom of the housing 20 is provided with a plurality of spaced annular notches 27. Attached to the bottom of the housing 20 by screws or other suitable attaching means is a catch ring 28, which carries a pair of pivotally mounted dogs 29. The dogs 29 are provided with central semi-circular portions 30 and are pivotally attached at one end to the ring 28. A coil spring 31 extends between the opposite ends of the dogs 29 to bias them toward the center of the ring 28. A portion of each dog 29 projects outwardly beyond the periphery of the ring 28 to permit manual pivoting of the dogs 29 in opposition to the biasing of the spring 31.

The portion of the steering column 11 within the lower part of the housing 20 is provided with splines which slidably fit into a complementary spline receiving portion of the receiver 12. Other suitable slidable connecting means may also be provided.

In operation, the steering assembly functions in the conventional manner until a collision occurs. In such event, the impact from the driver's body and the collision cause the steering wheel 10 to move away from the driver. This movement is permitted by downward movement of the steering column 11 against the pressure of the coil spring 26, with the splines moving along the spline receiving portions of the receiver 12. The coil spring 26 thus absorbs the impact in a resilient manner.

As the steering column 11 moves downwardly, one or more of the notches 27 may become aligned with the dogs 29. In such case, the spring causes the dogs 29 to move into one of the notches 27 to hold the steering wheel in depressed position. This prevents any backlash which might result from a release of pressure on the coil spring 26. It should be noted, however, that the operation of the steering assembly is not adversely affected while it is held in depressed position.

In order to facilitate release of the dogs 29, I may provide a manually operable release member which comprises a slide 36, which is attached to the side of the housing 20 by a pair of screws 37. The screws 37 have shanks which pass through slots 38 in the slide 36 to permit vertical movement of the slide 36. Attached to the bottom of the slide 36 are a pair of springs 40, which are adapted to fit within a pair of slots 41 in the ends of the dogs 29, adjacent the coil spring 31.

In use, if the steering column 11 has been depressed and the semi-circular portions 30 of dogs 29 are engaged with one of the notches 27, their release may be accomplished by first exerting manual pressure on the catch 39 to move the slide 36 upwardly. This brings the side lower ends of springs 40 into the slots 41. The springs 40 are contracted, but cannot move the dogs 29 apart until the pressure from the large coil spring 26 is released.

The steering wheel 10 is then depressed slightly, relieving the dogs 29 from the pressure of the coil spring 26. This permits the springs 40 to overcome the weaker pressure of the smaller coil spring 31 and move the dogs 29 apart. The steering column 11 may then be moved upwardly to its normal position.

With regard to the coil spring 26, it will be noted that the flange 18 is completely free from any pressure from the coil spring 26, being protected by the collar 35 of bushing 19. There is accordingly no interference with the operation of the steering wheel 10 and steering column 11.

The size, length and strength of the coil spring 26 can be varied as desired. In this connection, the adjustable bushing 19 can be adjusted as desired either for the purpose of lengthening or shortening the steering wheel 10 or to change the spring pressure.

It will be noted that as the steering wheel 10 and steering column 11 move downwardly, the steering column housing 13 moves with them. If the mounting member 15 and screws 16 are used, the ends of the screws 16 are sheared off by downward movement of the steering column housing 13 before any pressure is exerted upon the coil spring 26.

We claim:

1. A depressible steering construction for automotive vehicles comprising a substantially rigid steering wheel mounted on the upper end of an elongated steering column, the lower end of said steering column carrying a plurality of splines, said splines being slidably and operatively connected to the spline receiving portions of a receiver, a steering column housing surrounding the portion of said steering column between the dashboard of the vehicle and the steering wheel, a substantially cylindrical housing having a hollow portion in the upper part thereof, said housing having in the lower part thereof an elongated bearing, said steering column extending through said hollow portion and being rotatably and slidably journaled in said bearing, said housing having at the juncture of said hollow portion and bearing an integral shoulder, an elongated coil spring surrounding the portion of said steering column within the hollow portion of said housing, said coil spring having its lower end bearing against said shoulder, a bushing screw threadedly mounted in the top of said housing, said steering column rotatably and slidably extending through said bushing, said steering column having a flange, said bushing having a downwardly directed collar, said collar having a central recess, said flange fitted within said recess with the bottom of said collar extending beneath the bottom of said flange, a washer disposed adjacent the bottom of said collar, the upper end of said coil spring bearing against said washer, said steering column having a plurality of annular notches disposed adjacent and above the lower end of said housing, a catch member comprising a ring attached to the bottom of said housing surrounding the lower part of said steering column, said ring having a pair of dogs, said dogs being spring biased toward said steering column, said steering column adapted upon downward force being exerted thereon to move downwardly against the pressure of said coil spring, said dogs being adapted to engage one of the notches in said steering column to hold said steering column in depressed but operable position.

2. The structure set forth in claim 1, and a mounting member attaching said steering column housing to the dashboard, at least one screw extending from said mounting member into said steering column housing, the end of said screw adapted to be sheared off upon impact against said steering column housing to permit downward movement of said steering column housing and steering wheel.

3. A depressible steering construction for automotive vehicles comprising a substantially rigid steering wheel mounted on the upper end of an elongated steering column, a substantially cylindrical housing having a hollow portion in the upper part thereof, said housing having in the lower part thereof an elongated bearing, said steering column extending through said hollow portion and being rotatably and slidably journaled in said bearing, said housing having at the juncture of said hollow portion and bearing an integral shoulder, an elongated coil spring surrounding the portion of said steering column within the hollow portion of said housing, said coil spring having its lower end bearing against said shoulder, a bushing screw threadedly mounted in the top of said housing, said steering column rotatably and slidably extending through said bushing, said steering column having a flange, said bushing having a downwardly directed collar, said collar having a central recess, said flange fitting within said recess with the bottom of said collar extending beneath the bottom of said flange, a washer disposed adjacent the bottom of said collar, the upper end of said coil spring bearing against said washer, said steering column having a plurality of annular notches disposed adjacent and above the lower end of said housing, a catch member comprising a ring attached to the bottom of said housing surrounding the lower part of said steering column, said ring having a pair of dogs, said dogs being spring biased toward said steering column, said steering column adapted upon downward force being exerted thereon to move downwardly against the pressure of said coil spring, said dogs being adapted to engage one of the notches in said steering column to hold said steering column in depressed but operable position.

4. A depressible steering construction for automotive vehicles comprising a substantially rigid steering wheel mounted on the upper end of an elongated steering column, a substantially cylindrical housing having a hollow portion in the upper part thereof, said housing having in the lower part thereof a bearing, said steering column extending through said hollow portion and being rotatably and slidably journaled in said bearing, said housing having a shoulder, an elongated coil spring surrounding the portion of said steering column within the hollow portion of said housing, said coil spring having its lower end bearing against said shoulder, a bushing screw threadedly mounted in the top of said housing, said steering column rotatably and slidably extending through said bushing, said steering column having a flange longitudinally slidably disposed within the upper part of the hollow portion of said housing, said bushing having a downwardly directed collar, said collar having a central recess, said flange fitting within said recess with the bottom of said collar extending beneath the bottom of said flange, the upper end of said coil spring exerting upward pressure against the bottom of said collar.

5. A depressible steering construction for automotive vehicles comprising a steering wheel mounted on the upper end of an elongated steering column, a substantially cylindrical housing having a hollow portion, said steering column rotatably and slidably extending through said housing, a bushing mounted in the top of said housing an elongated coil spring surrounding said steering column within the hollow portion of said housing, said steering column having a flange, said bushing having a downwardly directed collar, said collar having a central recess, said flange fitting within said recess with the bottom of said collar extending beneath the bottom of said flange, the upper end of said coil spring exerting upward pressure against the bottom of said collar.

6. The structure set forth in claim 5, and at least one fastening member holding said steering column in fixed longitudinal relationship to said housing, said fastening member having a portion adapted to be sheared off upon impact against said steering column to permit relative movement of said steering column with respect to said housing.

7. The structure set forth in claim 3, and a manually operable release comprising a slide member slidably mounted on said housing, said slide member having spring means at the lower end thereof, said spring means adapted to engage said dogs upon sliding movement of said slide member and exert pressure to move said dogs out of said notches.

8. The structure set forth in claim 5, and said steering column having a plurality of annular notches disposed adjacent and above the lower end of said housing, a catch member comprising a ring attached to the bottom of said housing surrounding the lower part of said steering column, said ring having a pair of dogs, said dogs being spring biased toward said steering column, said steering column adapted upon downward force being exerted thereon to move downwardly against the pressure of said coil spring, said dogs being adapted to engage one of the notches in said steering column to hold said steering column in depressed but operable position.

9. The structure set forth in claim 8, and a manually operable release comprising a slide member slidably mounted on said housing, said slide member having spring means at the lower end thereof, said spring means adapted to engage said dogs upon sliding movement of said slide member and exert pressure to move said dogs out of said notches.

References Cited in the file of this patent

UNITED STATES PATENTS

| 2,028,953 | Roark | Jan. 28, 1936 |
| 2,140,319 | Heppner | Dec. 13, 1938 |
| 2,227,821 | Burrell | Jan. 7, 1941 |

FOREIGN PATENTS

| 378,932 | Italy | Feb. 27, 1940 |